United States Patent [19]

Bridenbaugh et al.

[11] Patent Number: 4,595,156
[45] Date of Patent: Jun. 17, 1986

[54] DECEPTION PATTERN FOR CAMOUFLAGE

[75] Inventors: John C. Bridenbaugh, Springboro; Robert W. Love, Fairborn, both of Ohio

[73] Assignee: The United States of America as represented by the Secretary of the Air Force, Washington, D.C.

[21] Appl. No.: 622,379

[22] Filed: Jun. 20, 1984

[51] Int. Cl.$^4$ ............................................. B64F 1/00
[52] U.S. Cl. ..................................... 244/1 R; 434/88
[58] Field of Search ................... 244/1 R; 434/88, 85; 428/919; 114/15; 89/1 A

[56] References Cited

U.S. PATENT DOCUMENTS

| | | | |
|---|---|---|---|
| 2,190,691 | 2/1940 | Barclay | 41/17 |
| 2,351,891 | 6/1944 | Weisbaum | 35/25 |
| 3,324,574 | 6/1967 | Markley | 434/88 |
| 3,800,441 | 4/1974 | MacPherson | 434/85 |
| 4,089,491 | 5/1978 | Ferris | 244/1 R |
| 4,212,440 | 7/1980 | Ferris | 244/1 R |
| 4,406,428 | 9/1983 | Ferris | 244/1 R |

Primary Examiner—Galen L. Barefoot
Attorney, Agent, or Firm—Donald J. Singer; Bernard E. Franz

[57] ABSTRACT

An object intended for concealment or a facsimile thereof is used to generate the pattern by creating shadows on a flat surface at several elevation angles, with the resulting set of shapes then rotated in azimuth, in order to produce an abundance of quasi-object shapes within the pattern. The shapes are created in such a way as to be viewing-angle independent, thus producing a background upon which the object is difficult to see from any viewing angle. Selected azimuth and/or elevation angles can also be employed, resulting in patterns that are viewing-angle dependent.

13 Claims, 3 Drawing Figures

DECEPTION PATTERN FOR CAMOUFLAGE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a deception pattern for camouflage, and more particularly to a technique for generating a pattern that obscures a given object placed upon the pattern. which is located on the ground.

The art of camouflaging objects such as aircraft by painting with various patterns for concealment is well known, as shown by U.S. patents to the two well-known artists McClelland Barclay (U.S. Pat. No. 2,190,691) and Keith Ferris (U.S. Pat. Nos. 4,089,491, 4,212,440, and 4,406,428). The use of a structure to simulate an actual airplane and serve as a decoy is shown in U.S. Pat. No. 2,351,891 to Weisbaum.

SUMMARY OF THE INVENTION

An object of the invention is to provide optical deception and concealment so as to degrade, delay and confuse the visual acquisition of resources by an attacking enemy—for example aircraft parked on a ramp. A specific object is to provide a systematic method for generating a deception pattern that obscures a given object placed upon it by virtue of having visual elements characteristic of the object visible in the pattern. Patterns created with this technique can be used for the purpose of denying the enemy easy acquisition of objects.

According to the invention, an object intended for concealment or a facsimile thereof is used to generate the pattern in order to produce an abundance of quasi-object shapes within the pattern. The shapes are created in such a way as to be viewing-angle independent, thus producing a background upon which the object is difficult to see from any viewing angle.

The invention permits the synthesis of effective deception patterns that degrade the ability of an observer to locate and identify objects placed upon them.

DETAILED DESCRIPTION

Figure 1:
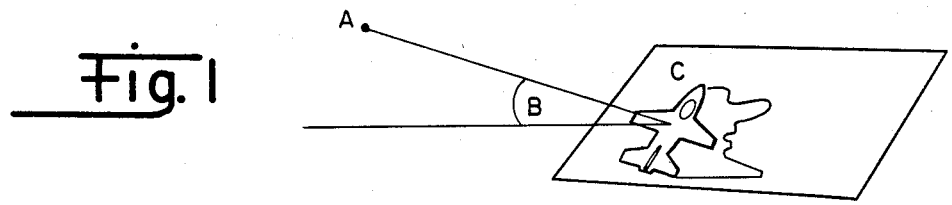
FIG. 1 is a diagram showing the methodology for creating a deception pattern according to the invention.
Figure 2:
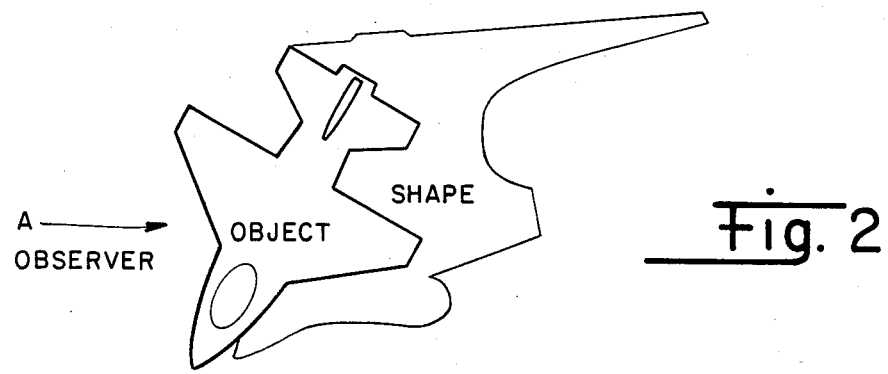
FIG. 2 is a dlagram showing elevation angle shape generation.

FIG. 1 is a diagram showing the methodology for creating a deception pattern. An observer eye location A is chosen at some elevation angle B with azimuth angle held constant. A single point source of light is placed at point A and a facsimile of the object chosen for concealment is placed on a flat surface at a location C. The distance from point A to location C is chosen to be sufficiently great such that rays of light from point A striking the object will not be significantly divergent. This situation creates a shadow on the flat surface that can be copied in detail. Such a shadow shape will appear to be identical in outline to the object shape for an eye positioned at the given azimuth and elevation angle. This shape therefore captures identifying characteristics of the object based upon elevation angle. FIG. 2 is a diagram showing elevation angle shape generation. Changing angle B in a systematic way results in a family of shapes having characteristics peculiar to changes in elevation viewing angle.

Figure 3:
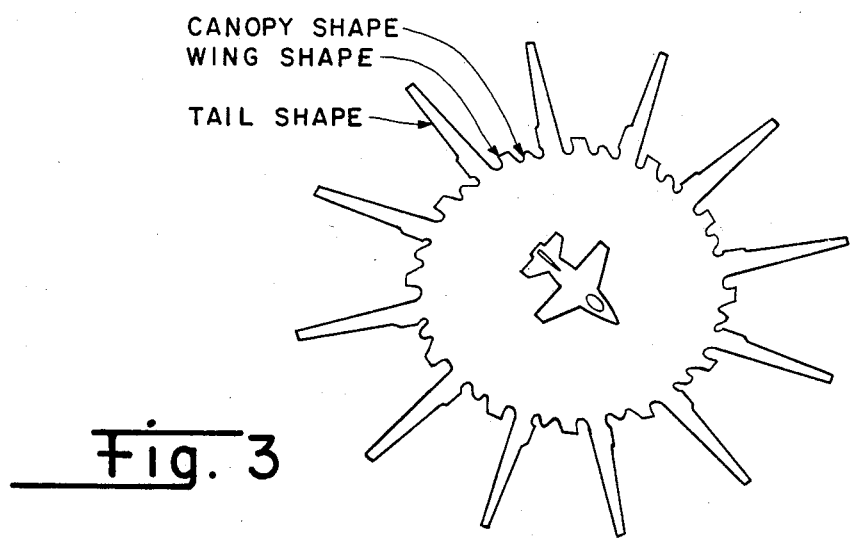
FIG. 3 is a diagram showing an example of a shape rotated in place obscuring the view of an aircraft located at its center for low-angle elevation deception.

The shapes thus created are then repeated in rotated azimuth positions to produce a family of shapes that are sensitive to changes in azimuth viewing angle as well as elevation angle. FIG. 3 is a diagram showing an example of a shape rotated in place obscuring the view of an aircraft located at its center for low-angle elevation deception. The resulting pattern is rich in characteristic shapes of the original object from any viewing angle and is therefore effective in obscuring the true location of the object. The tone of the pattern (or shades of gray) should approximate the reflectivity of the object being concealed as well as any real world shadows caused by the object.

Various modifications may be made to the present invention without departing from the spirit or the scope of the following claims. For example, the pattern may be created on a surface other than the ground, such as the side of a building, with the object adjacent thereto on the ground. The object being obscured need not be located on the pattern, but merely in the vicinity thereof. Also, deception can be created with the object completely absent. In another embodiment, a deception pattern may be created without changing either the elevation or the azimuth angle. Also, one or both angles may be changed.

We claim:

1. The method of producing a deception pattern. using a unit which is the object intended for concealment or a facsimile thereof, comprising:
    placing said unit on a flat surface;
    placing a point source of light at a point which has a chosen elevation angle with respect to said unit, and a sufficient distance from said unit that rays of light from the point source striking said unit will appear substantially parallel, thereby creating a sharply defined shadow on said flat surface;
    copying said shadow in detail on said surface;
    changing said elevation angle in a systematic manner;
    repeating said copying step for each selected elevation angle; and
    reproducing in rotated azimuth the shapes thus created to produce a family of shapes accommodating changes in pattern azimuth viewing angle as well as elevation angle.

2. The method of producing a deception pattern, using a unit which is the object intended for concealment or a facsimile thereof, comprising:
    placing said unit on a flat surface;
    placing a point source of light at a point which has a chosen elevation and azimuth angle, and a sufficient distance from said unit that rays of light from the point striking the unit will be substantially nondivergent, thereby creating a shadow on the flat surface which is then copied in detail;
    changing at least one of said angles in a systematic manner; and
    repeating said copying step for each selected angle, to produce a family of shapes that are sensitive to changes in viewing angle.

3. The method of synthesizing a deception pattern, from an object intended for deceptive concealment comprising the steps of:

locating said object on a pattern receiving surface;

creating a shadow of said object on said surface using a parallel ray distant light source located at a predetermined elevation angle above said unit;

copying in detail a predetermined azimuthal portion outline of said shadow onto said receiving surface;

changing said elevation angle in a systematic manner;

repeating said azimuthal portion copying step for shadow outline elements over-extending said copied first shadow outline at each elevation angle, thereby fabricating a composite outline pattern rich in shapes characteristic of said object; and shading said composite outline pattern in accordance with the reflectivity of said object.

4. The method of claim 3 further including the step of iterating said predetermined azimuthal portion composite pattern over a predetermined azimuthal extent of said pattern receiving surface.

5. The method of claim 3 wherein said predetermined elevation angle is smaller than ninety degrees.

6. The method of claim 3 further including the step of substituting a facsimile structure for said object prior to said locating step.

7. A method for constructing a multiple faceted concealment and deception pattern for the background surface surroundings of a stationary aircraft comprising the steps of:

locating a rendition of said aircraft adjacent said background surface surroundings;

illuminating said aircraft rendition from an elevated and remote point source of light, thereby imparting a shadow of said aircraft on said background surface;

tracing the identifying characteristic shape of a selected salient feature portion of said shadow onto said background surface;

replicating said traced salient feature portion of said shadow into a multiply-faceted repeating family of said characteristic shapes azimuthally surrounding said rendition; and shading said repeating family of shapes on said background surface in accordance with the reflectivity of the corresponding aircraft portion;

whereby said multiply-faceted pattern captures identifying characteristics of said aircraft and minimizes the optical contrast and physical shape distinctions between said aircraft and said background surroundings.

8. The method of claim 7 further including the steps of:

changing the angle of elevation of said source of light with respect to said rendition in a systematic manner; and repeating said tracing and replicating steps at each light source elevation.

9. The method of claim 7 wherein said rendition is comprised of an aircraft of the type being concealed.

10. The method of claim 7 wherein said rendition is a facsimile of said aircraft.

11. The method of claim 7 wherein said salient feature portion includes the rudder element of said aircraft.

12. The method of claim 7 wherein said background surface surroundings include surfaces residing in two planes.

13. The method of claim 9 further including the step of changing the azimuthal angle relationship between said light source and said aircraft and repeating said tracing and replication steps at each light source location.

* * * * *